No. 660,509. Patented Oct. 23, 1900.
R. N. HATCH.
SELF SUPPORTING BICYCLE PUMP.
(Application filed Oct. 7, 1899.)
(No Model.)
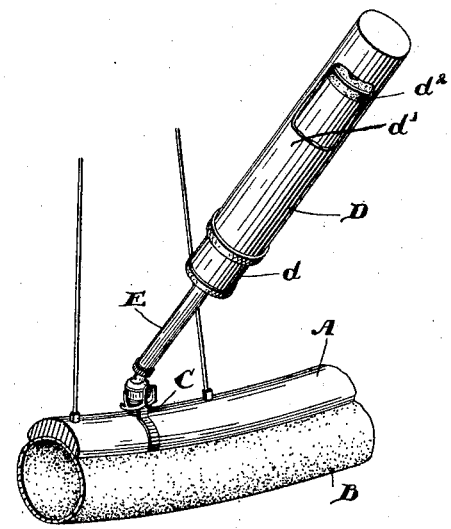
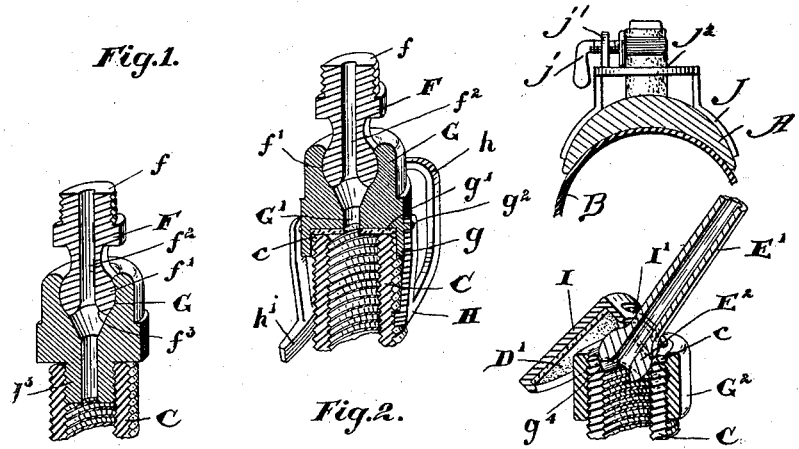
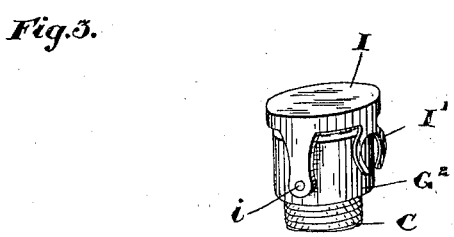
Witnesses.
A. Dennison.
C. W. McAdam.
Inventor.
R. N. Hatch.
by Fetherstonhaugh & Co
Attys.

UNITED STATES PATENT OFFICE.

ROBERT NELSON HATCH, OF WOODSTOCK, CANADA.

SELF-SUPPORTING BICYCLE-PUMP.

SPECIFICATION forming part of Letters Patent No. 660,509, dated October 23, 1900.

Application filed October 7, 1899. Serial No. 732,935. (No model.)

*To all whom it may concern:*

Be it known that I, ROBERT NELSON HATCH, of the town of Woodstock, in the county of Oxford, in the Province of Ontario, Canada, have invented certain new and useful Improvements in Self-Supporting Bicycle-Pumps, of which the following is a specification.

My invention relates to improvements in bicycle-pump couplings; and the object of the invention is to provide an efficient means for connecting a pump to the valve of a bicycle-tire, which may be done quickly and without unnecessary labor and which will also be flexible to such a degree as to prevent any injury to the connection during the process of pumping; and it consists, essentially, of having the air-tube leading from the pump connected to the valve by a ball-and-socket joint and a cap connected to the top of the valve-stem in the manner hereinafter more particularly explained.

Figure 1 is a perspective view of a portion of a bicycle rim and tire, showing my improved pump and connection to the valve. Fig. 1ª is a detail view of means for holding a valve-stem rigid. Fig. 2 is an enlarged detail of the preferred form of connection. Figs. 3, 4, and 5 are details of alternative forms.

In the drawings like letters of reference indicate corresponding parts in each figure.

A is the rim of the bicycle-tire; B, the tire; C, the valve-stem, provided with a screwed upper end, and D is the bicycle-pump, which is made of two telescopic portions $d$ and $d'$, the portion $d$ having a washer $d^2$ in order to make it air-tight. This pump operates in the usual way.

E is an air-tube connected to the valve-piston and provided with a threaded end which is screwed onto the threaded end $f$ of the ball-stem F. The ball $f'$ is formed at the lower end of the stem, and a central passage-way $f^2$ is provided. The ball fits within a socket G and is provided with an open mouth $f^3$ at the end of the passage-way. The socket G is provided with a downwardly-extending flange $g$, fitting over the threaded top $c$ of the valve-stem, and a washer $g'$ is provided at the bottom of the socket and the top of the valve-stem. On pins $g^2$ on the socket G is pivotally swung the grip H, which is provided with a loop $h$ for operating it and knurled extensions $h'$, so that when the grip is swung into the position shown in Fig. 2 the knurled extensions will fit into the thread and prevent the withdrawal of the socket from the top of the stem. In order to remove the grip, it is merely necessary to pull outwardly upon the loop $h$ until the extensions $h'$ are thrown free of the thread. The socket G is also provided with a passage-way G'.

In Fig. 3 I provide a threaded extension $g^3$, which in this case is fitted into an internal thread in the top of the stem C; but I prefer the form shown in Fig. 2, as being the quicker means of connection.

In Figs. 4 and 5 I show another alternative form, in which a cap I is swung on pins $i$ upon the socket G², which in this instance has a narrow socket $g^4$ at the top of the stem $c$. The tube E' of the pump is designed to extend through the spring-fingers I' of the cap I and is formed with a ball E² at the end thereof, which fits the narrow socket $g^4$. A rubber washer D' is provided underneath the cap I, and when the cap is down it is swung into the position shown in Fig. 5 and completely closes the top of the valve-stem. Of course before the cap I is put on the ball end of the tube E' must be withdrawn from the spring-fingers I'.

In the construction I have before referred to, particularly as to Figs. 1 and 2, it will be seen that I am enabled by the telescopic form of the pump to form a compact air-pump, which in working position will necessarily enable me to fill the tire much more quickly than with the ordinary pumps now in use. I can also manipulate my pump with less care as to the position of the connection of the valve without deleteriously affecting such connection. The pump is also more readily connected to the valve, as there is only one connection, and there is no rubber tube likely to be burst or spoiled during the pumping.

In case the valve-stem is of rubber or other flexible material it is necessary that I should hold the same more rigid, and for this purpose I use in connection with my ball-and-socket joint a bridge J, which straddles the rim and encircles the stem, as indicated in Figs. 1 and 1ª. A set-screw $j$ extends through an upwardly-extending projection $j'$ at the side of the center hole $j^2$ of the bridge, and as this set-screw has an enlarged end it can be tightened onto the valve-stem, so as to hold it rigid, no matter what height such valve-stem projects above the rim of the wheel.

What I claim as my invention is—

1. An air-pump comprising a barrel and a hollow piston-rod adapted to reciprocate and rotate therein and having a coupling formed with a round or spherical metal conduit rigidly connected with the end of said piston-rod and a secondary section or supplementary conduit overlapping the said spherical conduit so as to give a flexible or universal movement in relation to the same and means for attaching the same to a pneumatic-tire valve.

2. In a bicycle-pump coupling, the combination with the air-expelling tube, of a ball formed at the end thereof, a socket fitting on the ball and provided with a central passageway and a downwardly-extending external flange fitting over the stem, and a grip pivoted on the socket and having an extension-clasp to fit the thread as and for the purpose specified.

3. In a bicycle-pump coupling, the combination with the air-expelling tube, and a connection fitting over the stem of the valve, of a grip pivoted on the connection and having an extension-clasp to fit the thread as and for the purpose specified.

4. In a device of the class described the combination with the valve-stem, of a bridge fitting on the rim of the bicycle and provided with a central orifice and a set-screw extending through a projection extending upwardly from the bridge and designed to clamp the stem firmly in position as and for the purpose specified.

ROBERT NELSON HATCH.

Witnesses:
B. BOYD,
A. DENNISON.